US006588304B2

(12) United States Patent
Kady et al.

(10) Patent No.: US 6,588,304 B2
(45) Date of Patent: Jul. 8, 2003

(54) QUICK DISCONNECT OFFSET HEAD RATCHET WRENCH

(76) Inventors: Darren J. Kady, 6001 Morgan's Glen Pl., Glenn Allen, VA (US) 23059; Benny R. Barnes, HCR 7, Box 802, Rte. 688, Madison, VA (US) 22727

( * ) Notice: Subject to any disclaimer, the term of this patent is extended or adjusted under 35 U.S.C. 154(b) by 0 days.

(21) Appl. No.: 09/953,908

(22) Filed: Sep. 17, 2001

(65) Prior Publication Data

US 2002/0069728 A1 Jun. 13, 2002

Related U.S. Application Data

(60) Provisional application No. 60/233,323, filed on Sep. 15, 2000.

(51) Int. Cl.[7] .......................... B25B 13/46; F16C 11/00; F16D 1/12

(52) U.S. Cl. .......................... 81/60; 81/177.8; 403/103; 403/324

(58) Field of Search ........................ 81/60, 177.7–177.9, 81/180.1, 185.2; 403/103, 324, 93

(56) References Cited

U.S. PATENT DOCUMENTS 5,694,818 A * 12/1997 Nickipuck ..................... 81/60
6,053,076 A 4/2000 Barnes

* cited by examiner

*Primary Examiner*—D. S. Meislin
(74) *Attorney, Agent, or Firm*—Sheldon H. Parker

(57) ABSTRACT

The invention is an improved Offset Head Ratchet Wrench. It allows the user to remove or interchange different size ratchet heads or tools quickly with the push of a button attached at the head of the activating shaft. This shaft can activate in three stages if it is operating an offset wrench. The activating shaft is attached to an E shaped structure, which is made up of an activating shaft, locking pin and pivot pin, all three being attached to a central plate. Stage one is when the activating shaft is in a partially depressed position. The locking pin releases the ratchet head for rotation only. Stage two is when the activating shaft is fully depressed, it releases the pivot pin, allowing the ratchet head to be easily and quickly removed or exchanged for another type of tool with a similarly designed head.

17 Claims, 5 Drawing Sheets

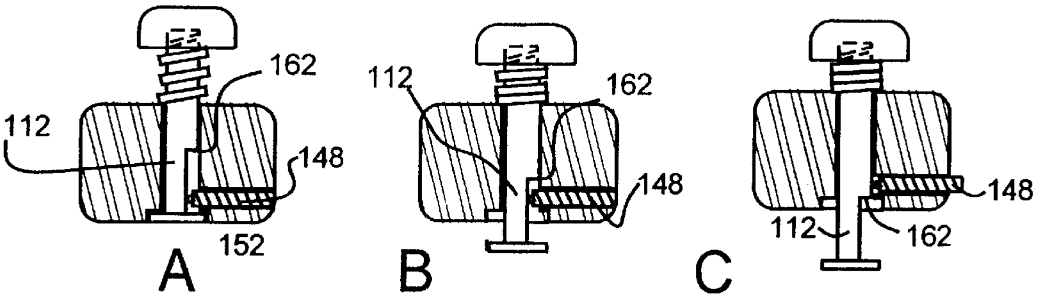
Figure 7
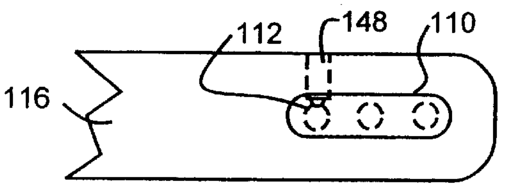
Figure 8
Figure 9
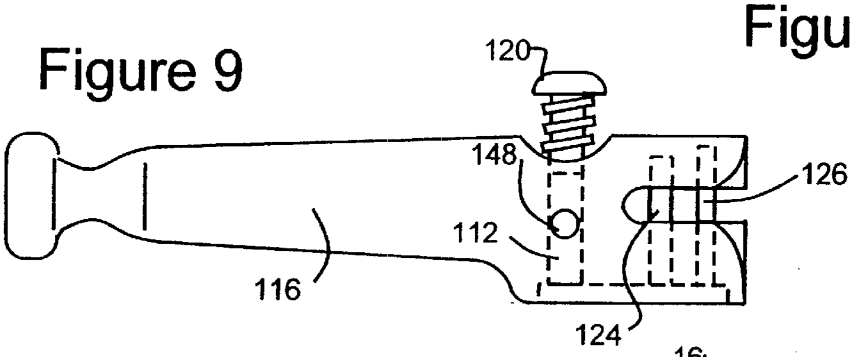
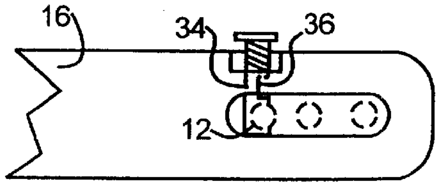
Figure 10
Figure 11
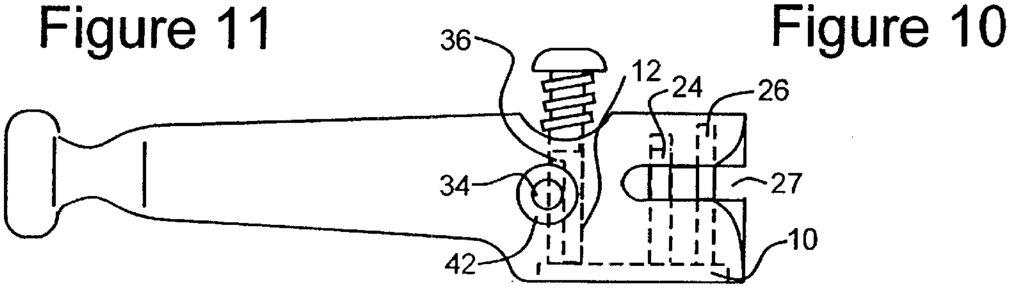

Figure 17
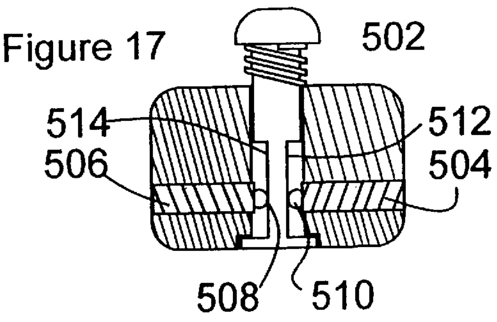
Figure 15
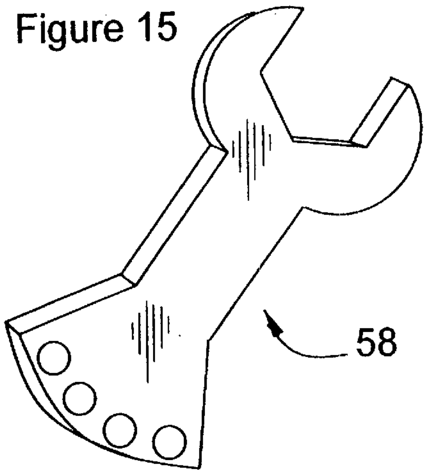
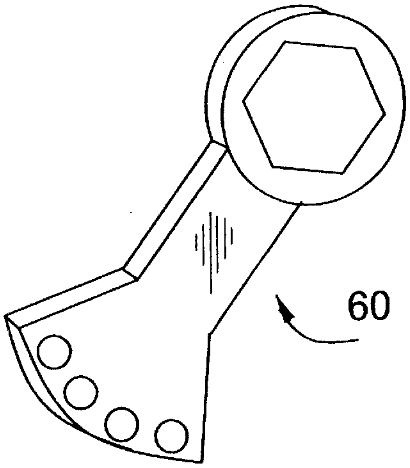
Figure 16
Figure 14
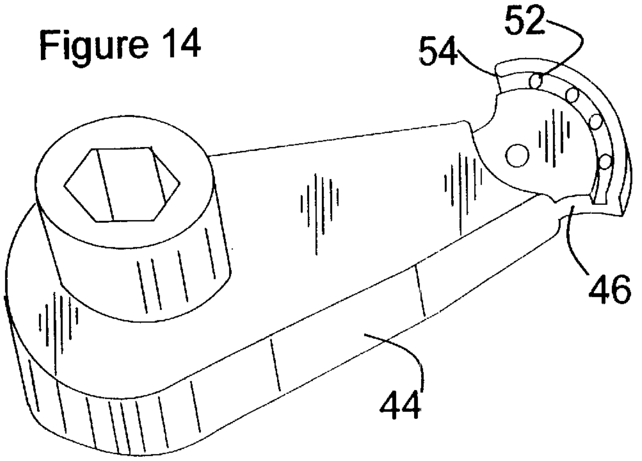

QUICK DISCONNECT OFFSET HEAD RATCHET WRENCH

This application claims the benefit of provisional application No. 60/233,323, filed Sep. 15, 2000.

FIELD OF THE INVENTION

The present invention relates to a standard wrench, a socket wrench, and Offset Head Ratchet Wrenches. This allows the user to quickly remove the wrench head from the handle, enabling the user to use the head of the wrench as a palm wrench. In addition, the user can quickly change the size or type of head necessary to complete the task at hand.

DESCRIPTION OF PRIOR ART

U.S. Pat. No. 6,053,076 issued to Benny R. Barnes included the ability to remove the head of the ratchet from the handle. This invention suffers from the disadvantage that the user would have to completely unscrew the pivot pin to remove the ratchet head and then reinsert the screw in the pivot hole to reinstall the new ratchet head. This requires a two-hand operation and loose parts that may drop during the exchange. Also, the possibility of crossing threads exist, and could cause damage to the threaded area in the wrench, rendering the tool useless. It also, requires substantially more time and effort for this complete exchange process.

SUMMARY OF THE INVENTION

The invention is an improved ratchet wrench with a quick release mechanism that enables the user to quickly remove or exchange the ratchet head for a different size ratchet head or type of wrench head with a similar connecting design. This different type of head can be an open-end wrench or a box style wrench for example. In a preferred embodiment the mechanism can be an E shaped structure having an activating shaft which passes through the handle, a locking pin, which selectively engages some of the plurality of holes located in the neck of the rotating head and a pivot pin that connects the handle to the wrench head. In a preferred embodiment the activating shaft has a button on it, when this button is depressed partially, it rests against a ball nose spring plunger pin that is perpendicularly aligned with the activating shaft. (one or more ball nose plungers, or some other type of device to allow or cause hesitation on the activation shaft) When additional pressure is applied to the button on the top of the activating shaft, this will cause the spring loaded ball on the ball nose spring plunger to depress, allowing the activating shaft to be fully depressed by moving beyond the ball nose spring plunger pin. When the activating shaft is partially depressed with the tip resting against the spring loaded ball of the ball nose spring plunger pin, it allows the locking pin to release the ratchet head's neck in order to change the angle by rotation, while still maintaining a solid connection between the handle and the ratchet wrench head with the pivot pin. This happens because the pivot pin is of greater length and remains in the locking position, which is when both the handle and the neck of the wrench head are connected. When the activating shaft is totally depressed it disengages the pivot pin thoroughly allowing the wrench head to be removed or exchanged. Another mechanism that can be used, but not limited to, that will also prohibit the pressure spring release activating shaft from totally depressing when pressure is applied, is a pin positioned perpendicularly and slightly offset to the activating shaft. In this application the activating shaft will have a cut out at a specific location. The wider part of the release pin will act as a seat for the activating shaft. This will only allow partial depression. The spring release pin also will have a cut out on one end of its shaft. When this release pin is pressed inward this will allow the cut out of the spring release pin to align itself with the activating shaft. When aligned with the cut out, the activating shaft is able to be fully depressed. When activating shaft is fully depressed it causes the pivot pin to be thoroughly disengaged from the flange. This allows the user with only one hand operation to easily remove or exchange the wrench head with another head size or style of similar flange design. When this quick release invention is used in a conventional straight wrench or ratchet wrench, another E shaped structure can be implemented, later identified in drawings as E2 or #50. However, this structure will have two pins of equal length, both disengaging at the same time, allowing the wrench head to be exchanged or removed quickly with the push of a one stage button on the top of the activating shaft. In this application a straight activating shaft can be used since there will be only one pressure point required for release only.

DESCRIPTION OF THE DRAWINGS

FIG. 7A is a cutaway view of an alternate activating shaft with ball nose spring plunger in the first position;

FIG. 7B is a cutaway view of an alternate activating shaft with the ball nose spring in the second position;

FIG. 7C is a cutaway view of an alternate activating shaft with the ball nose spring in the third position;

FIG. 8 is bottom view of a handle showing ball nose spring plunger in position.

FIG. 9 is cutaway side view of handle with ball nose spring plunger aligned in position against the activating shaft.

FIG. 10 is a bottom view of spring release pin in position (not depressed);

FIG. 11 is right side view of handle with spring release pin in position;

FIG. 14 is the ratchet head with the flange displaying a cut out along a plurality of holes;

FIG. 15 shows an open end wrench with a similar flange end with a plurality of holes for rotation;

FIG. 16 shows a box-end wrench with a similar flange end with a plurality of holes for rotation; and FIG. 17 is an alternate embodiment incorporating dual ball nose springs.

DETAILED DESCRIPTION OF THE INVENTION

The disclosed device enables a user to easily rotate the angle between a ratchet head and the angle without changing tools. The device also enables rapid removal and/or exchange of the existing ratchet head for a different size or type of wrench head. The disclosed quick release ratchet head invention illustrated is comprised of an E shaped structure, having several embodiments. Other methods of attachment can also be utilized that will be evident to those skilled in the art. In one embodiment, which is used for ratchets which have rotatable heads, the longest leg of the E shaped structure is the activating shaft, with the two pins being different lengths. The activating shaft can be threaded on one end and have a button with a spring between the button and the handle to maintain the E-shaped structure in adjacent the handle. The center leg or locking pin is the shortest to enable the center leg disengage, when the activating shaft is depressed, from one of the plurality of holes for rotation purposes. This allows the offset wrench to rotate while the third leg or the pivot pin remains connected between the handle and the flange of the ratchet head. Once the wrench head is rotated to the desired position, the activating shaft is released, returning the locking pin to its locked position ready for use. Preferably, the activating shaft is prevented from total depression by a mechanism interfering with the line of travel. Two ways this can be done, but not limited to, are (1) perpendicular ball nose spring plunger or (2) a spring release pin is inserted through the side of the handle. In the second embodiment, where the ratchet wrench is a straight conventional design, the E2 shaped structure can have an activating shaft as the longest leg and the other two legs can be of equal length in order for the simultaneous disengagement of both pins, the pivot pin and the locking pin to release the head of the ratchet quickly.

Figures 1, 2:
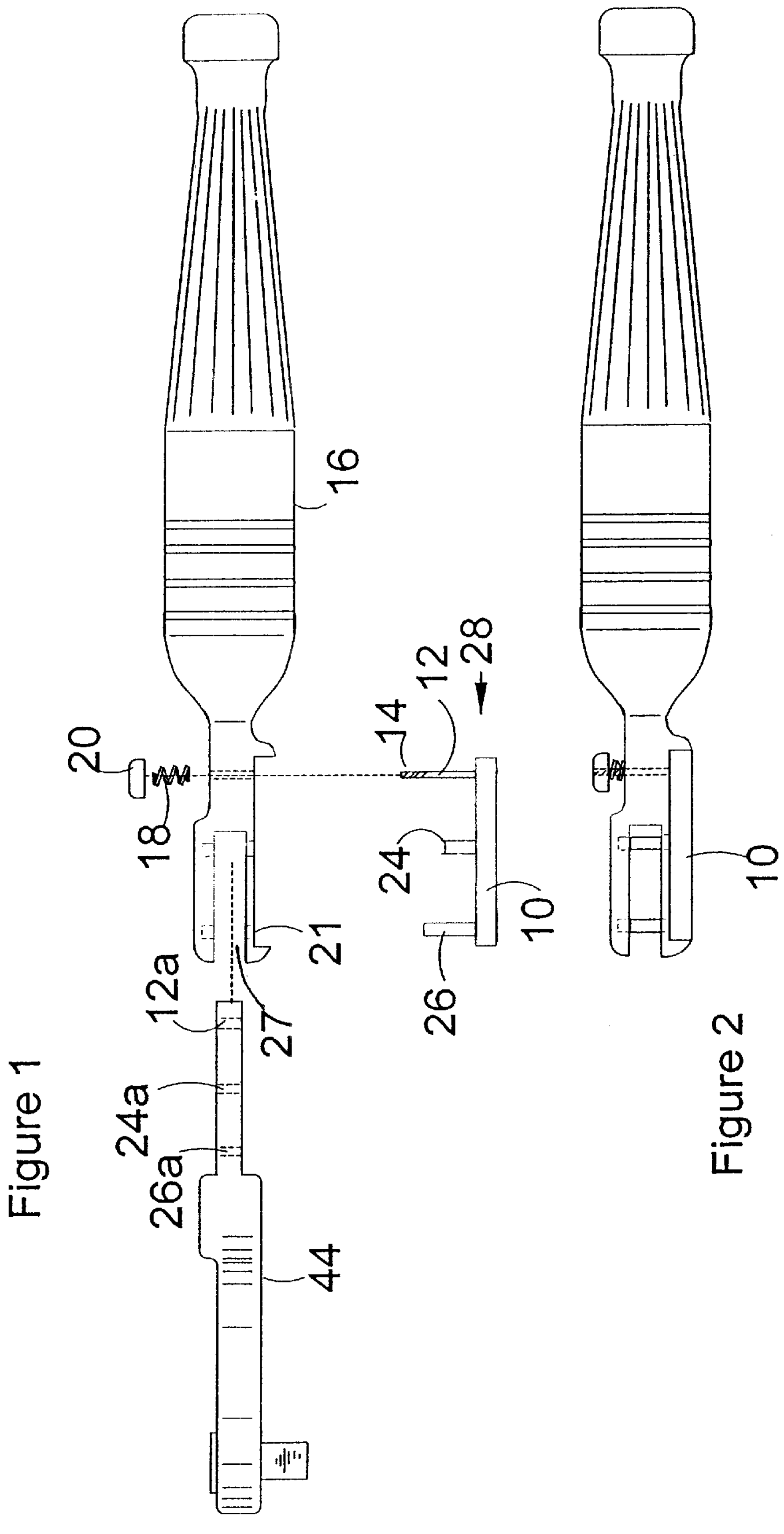
FIG. 1 is an exploded side view of handle showing the E structure and how it would insert through the handle of a wrench.
FIG. 2 is a cutaway side view of handle with E shaped structure inserted and recessed in handle.

In the first embodiment, illustrated in FIG. 1 the central plate 10 of the release device 28 has three pins attached to it at a right angle. The longest pin is the activating shaft 12 that is, in this embodiment, threaded at the distal end 14. The activating shaft 12 can be inserted into handle 16 from either the top or the underside and is a manufacturing and user preference. As described herein, the release device 28 is inserted through the bottom of the wrench receiving area 21 of the handle 16, however this is not intended to limit the disclosure. The receiving area 21 has three corresponding channels 15, 17 and 19 to receive the pivot pin, 26, locking pin 24, and activating shaft 12, respectively. Once the release device 28 is inserted through the receiving area 21, the activating shaft 12 extends beyond the opposing side of the handle 16. In a preferred embodiment a spring 18 can be placed over the threaded area 14 and a button 20 attached to the threaded area 14 of the activating shaft 12, the button 20 having a threaded hole 22 dimensioned to receive the threaded activating shaft 12. Alternatively, the shaft can remain unthreaded and the button can be welded, glued, or otherwise affixed to the shaft as known in the art. It should also be noted that other designs for engaging the activating shaft with the release device can be used and will be evident to those skilled in the art.

In the embodiment illustrated in FIGS. 1 and 2 is the preferable embodiment for use with the rotating, indexable wrench head as illustrated hereinafter. In this embodiment, the locking pin 24 is the shortest in length, so that when the activating shaft 12 is partially depressed, the locking pin 24 is the first pin to become disengaged from the flange 46 of the ratchet head 44. The flange 46 of the ratchet head 44 is dimensioned to fit within the receiving notch 27 in a manner that prevents the ratchet head 44 from wobbling, but permits easy removal. The flange 46 has channels 26*a* and 24*a* that are positioned and sized to receive the pivot pin 26 and locking pin 24 respectively. The dimensioning between the shaft 46 and the receiving notch 27 must be such that the interaction between parts is snug, but not a friction fit. The ratchet head 44, including the flange 46, is illustrated in more detail in FIG. 14. The depression of the activating shaft 12 enables the rotation of the head of the wrench 44. Once the desired position is reached, the activating shaft 12 is released, returning to its original position, and the ratchet head 44 is locked for use. The third pivot pin 26 has a length greater than that of the locking pin 24 and less than that of the activating shaft 12. When the activating shaft 12 is fully depressed, the pivot pin 26 is now disengaged from the flange 46. This allows the user to exchange or disconnect the head of the ratchet 44 quickly with a one hand operation.

The ratios between the activating shaft 12, locking pin 24 and pivot pin 26 are such that both the locking pin 24 and pivot pin 26 are released when the activating shaft 12 is fully depressed. During partial depression of the activating shaft 12, however, the pivot pin 26 must remain within the upper receiving notch 15 a sufficient distance to ensure stability during the rotation process. Thus, the proportions between the locking pin 24 and the pivot pin 26 must be such that partial depression of the activating shaft 12 removes the locking pin 24 from its channel 17 and complete depression of the activating shaft 12 further releases the pivot pin 26 from its channel 15. Since the ratchet 44 is not maintained in position by the activating shaft 12, the ratchet 44 can be removed without removal of the activating shaft 12.

FIG. 2 demonstrates the release device, E1 shaped structure 28 inserted into the receiving area 21. In the illustrated preferred embodiment, the E-shaped structure 28 is recessed into the receiving area 21 and handle 16.

Figure 3:
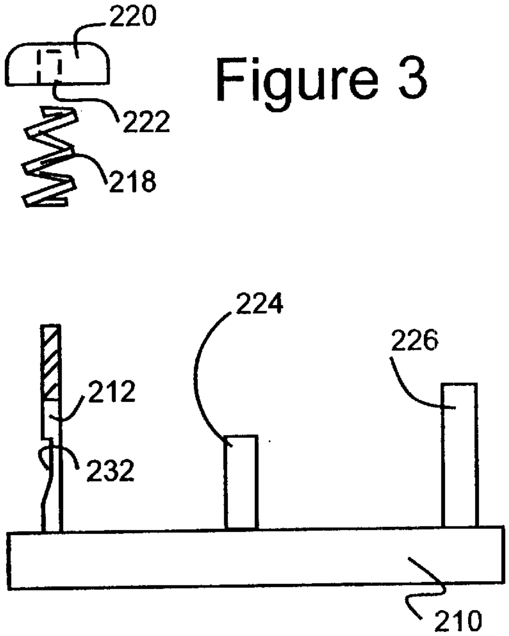
FIG. 3 is an exploded side view of an alternate embodiment of the E shaped structure.

FIG. 3 illustrates the E-shaped structure 228 with the activating shaft 212 displaying a cut out 232. The cut out 232 is a reduced diameter section of the shaft 212 that serves to stop the depression of the activating shaft 212. The cut out 232 interacts with the spring release pin 234, illustrated in FIG. 4, to provide the three degrees of activating shaft 212 depression. As stated heretofore, when the wrench is in use, the activating shaft 212 is in the first, or un-depressed, stage with both the pivot pin 226 and locking pin 224 within the upper receiving channels 15 and 17. To rotate the head 44, the activating shaft 212 is depressed to the second stage, bringing the release pin 234 to the upper end of the cutout 232. This releases the locking pin 224 from interaction with the upper receiving notch 15 and the head 44. The upper part of the cut out 232 acts as a stop when it meets up with the widest part of the spring release pin 234 in FIG. 4. To remove the head 44, the release pin 234 is depressed, thereby allowing the pin 234 to be aligned with the cut out 232 and enabling the activating shaft 212 to be fully depressed.

Figure 5:
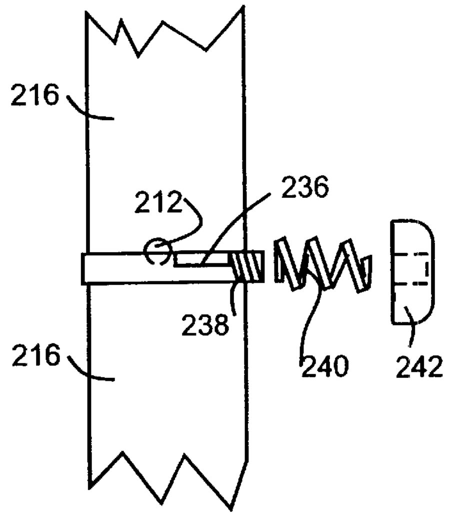
FIG. 5 is a top view of spring release pin while positioned in handle, preventing activating shaft from full depression.
Figure 4:
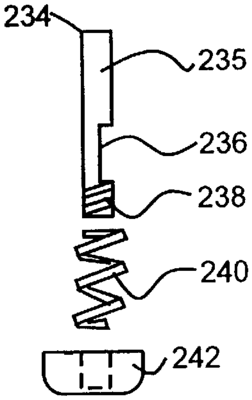
FIG. 4 is side view of the spring release pin with spring and cap.
Figure 6:
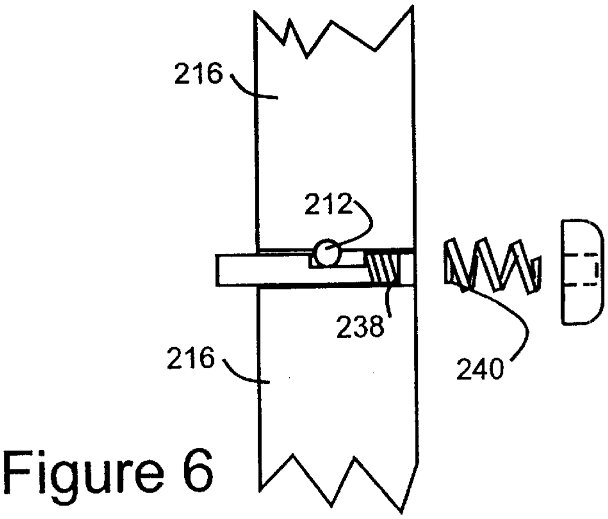
FIG. 6 is a top view of spring release pin being depressed, while positioned in handle, allowing the activating shaft to be fully depressed.

The spring release pin 234, illustrated in FIG. 4, consists of a cap 242, spring 240, a threaded section 328, cut out 236 and body 235. As shown in FIGS. 5 and 6, the spring release pin 234 can be inserted into the side of the handle 216, perpendicular to the activating shaft 212 while in a slightly offset position. When the spring release pin 234 is not depressed, the body 236 serves as a stop for the activating shaft 212, preventing full depression of the activating shaft 212. When the spring release pin 234 is depressed and held in a depressed position, its cut out 236 will be aligned with the activating shaft 212, allowing the activating shaft 212 to be fully depressed. This will allow the pivot pin 226 to be disengaged from flange 46 as illustrated in FIG. 1. The spring release pin 234 can be threaded 238 on one end to receive cap 42, or secured to the cap 42 through any other method known in the art. A spring 240 preferably serves to return the spring release pin 234 to its original position after depressing it to remove the head 46 of the wrench 44 in FIG. 1.

FIG. 5 demonstrates a top view of the spring release pin 234 positioned to stop the further depression of the activating shaft 212. As can be seen, the activating shaft 212 is stopped by the body of the shaft of the spring release pin 234. In order for the spring release pin 234 to prevent movement of the activating shaft 212, due to the fact that the spring release pin 234 is passing through the cut out 232 of the activating shaft 212, the positioning between the release pin 234 and activating shaft 212 must be precise.

FIG. 6 demonstrates a top view of the spring release pin 234 being depressed into the handle 216. As can be seen in this figure, in a depressed position the cutout 236 is moved into a position to enable the activating shaft 212 to clear the release pin 234, to complete the depression process.

FIGS. 7*a–c* demonstrate a rear view of an activating shaft 112 in an alternate embodiment using a ball nose spring plunger pin 148, where the ball 152 serves as the stopping point for the activating shaft 112. During use, the plunger pin 148 is in the position illustrated in FIG. 7A. To enable the ratchet head to rotate, the activating shaft 112 is depressed to a second step, illustrated in FIG. 7B, wherein the ball 152 encounters the shaft step 162. This level removes the rotating pin from the wrench head flange, enabling rotation. To remove the wrench head, the activating shaft 112 is pressed to the third step, illustrated in FIG. 7C. Since the ball 152 has the ability to recess into the pin 148 under pressure, applying additional pressure to the activating shaft 112 will cause the ball 152 to recess into ball nose spring plunger 148 enabling full depression of the activating shaft 112.

FIG. 8 demonstrates a bottom view of the handle 116 indicating alignment between the ball nose spring plunger pin 148 and the activating shaft 112 extending from the release device base 110. FIG. 9 demonstrates a side view of handle 116 showing approximate location of ball nose spring plunger pin 148 within the body of the handle 116. The ball nose spring plunger 148 will have to be strategically placed in order to create an additional pressure point or stopping point at the precise time to enable the locking pin 124 to be removed from the holes 52 in the neck 46 of the wrench head 44, illustrated in FIG. 14.

FIG. 10 demonstrates a bottom view using the spring release pin 234 system illustrated in FIGS. 3 and 4. When the spring release pin 234 is depressed, it allows the cut out 236 to align with the activating shaft 212. When this occurs the activating shaft 212 can be fully depressed allowing the pivot pin 226 to pass through the neck 46 of FIG. 14, thereby disconnecting the head 44 from the handle 16.

FIG. 11 demonstrates a right side view of handle 16 with the spring release pin 234 being strategically located in a slightly offset perpendicular position to the activating shaft 212. The wider part of the spring release pin 234 will pass through the cut out 232 of the activating shaft 212. This will allow the activating shaft 212 to stop when it reaches the widest part of the shaft of spring release pin 234.

Figures 12, 13:
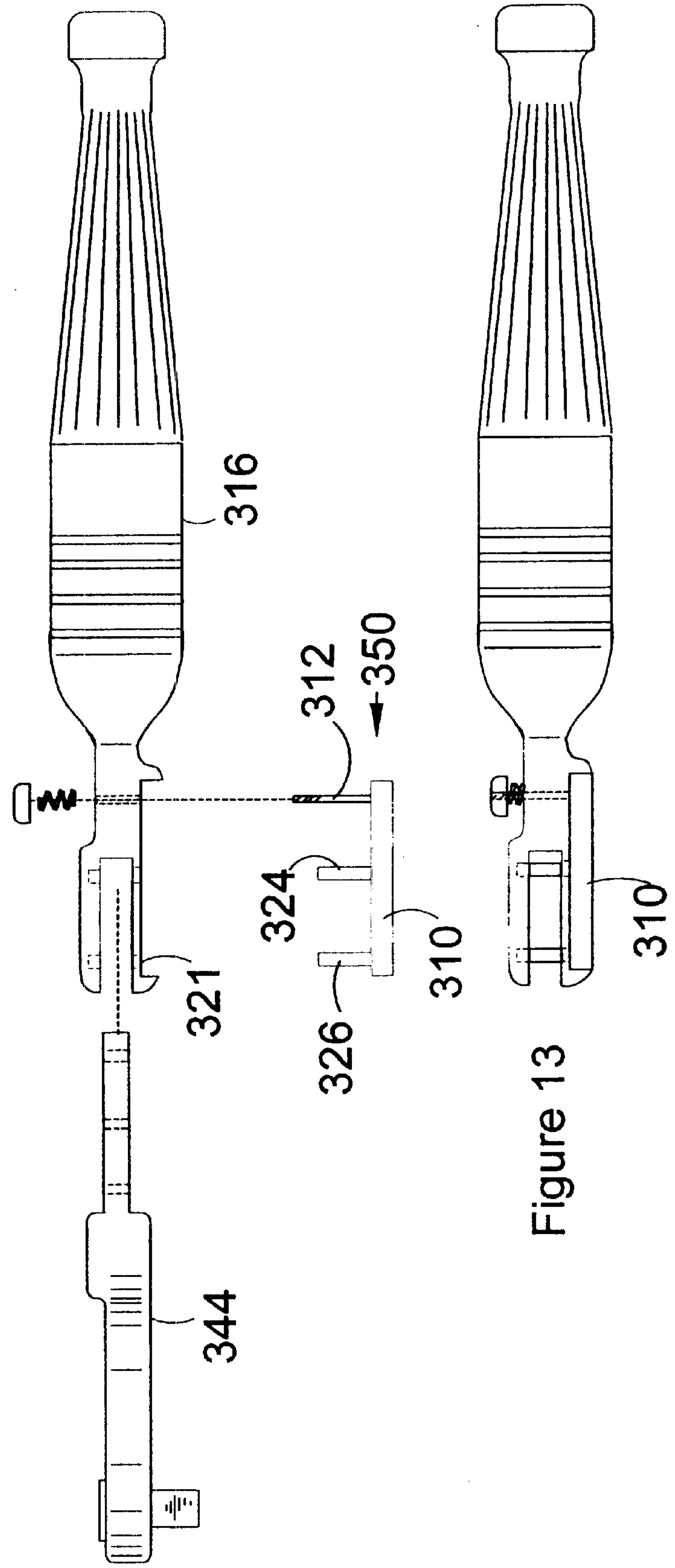
FIG. 12 is an exploded side view of ratchet and handle for use as a straight head ratchet wrench with the pivot pin and the locking pin being of equal length on the E2 structure.
FIG. 13 is a handle demonstrating the E2 structure in a recessed embodiment into the handle.

FIG. 12 demonstrates an alternate embodiment to the above release device in an E-shaped structure 350 with the pivot pin 326 and the locking pin 324 being of the same length. This embodiment can be used with a straight conventional wrench application (un-indexable) or with the indexable head. In this embodiment, both the pivot pin 326 and the locking pin 324 serve to lock the head of the wrench 344 in a solid straight position. FIG. 13 demonstrates this embodiment inserted into the wrench 316, wherein the E-shaped structure 310 is recessed into the handle 316.

FIG. 14 demonstrates in a preferred embodiment for the indexable ratchet head 44 wherein a cut out 54, on the underside of the flange 46, is provided with a plurality of holes 52. By recessing the holes 52, the distance of travel for the locking pins disclosed herein can be reduced, therefore enabling a quicker release for rotating of the head of the ratchet wrench 44. The recession of the holes 52 further enables the C-shaped structure 310 of FIGS. 12 and 13 to be used, as the locking pin 324 will disengage from the recessed holes 54 prior to the pivot pin 326 being disengaged from the pivot hole 55. When the cut out 54 is created it allows the locking pin 24, 234 or 324 to be longer in proportion to the depth of the cut out 54. By lengthening the locking pin 24 to be proportionately longer, equal to the depth of the cut out 54, greater strength is provided.

FIGS. 15 & 16 demonstrate some other type of wrench heads 58 and 60 that may be used with this new improved quick release design. It should be noted that the holes can be directly drilling through the wrench flange without the recess. In this embodiment, the E-shaped structure 28 of FIGS. 1 and 2 must be used.

In FIG. 17, the activating shaft 502 has dual cut outs 512 and 514 on either side. These serve to interact with ball nose spring plunger pins 504 and 506, each containing balls 510 and 508. This embodiment works in the same manner as that described heretofore in conjunction with FIGS. 7A–C. The dual ball nose spring plunger pins provide a greater resistance, which can be required in some applications.

Other methods of connecting the wrench head to the handle that meet the durability and rigidity criteria as set forth herein can also be incorporated.

What is claimed is:

1. A ratchet wrench having a removable ratchet head, said wrench having:

a body, said body having a handle and a receiving area, said receiving area having
 a first side,
 a second side, said second side being parallel to said first side
 a receiving notch, said receiving notch being between said first side and said second side and having an open end and a closed end;
 multiple channels, at least one of said channels extending from said first side, through said notch, to said second side;
 at least one activating shaft channel, said activating shaft channel extending from said first side to said second side, through said receiving area proximate said receiving notch closed end;
a release device, said release device having
 a central plate,
 multiple pins, each of said multiple pins being attached to and extending at right angles to said central plate, each of said pins being dimensioned to align with and fit within one of said multiple channels;
 at least one activating shaft, said at least one activating shaft being at right angles to said central plate, said activating shaft being dimensioned to align with and fit within said activating shaft channel;
a ratchet head, said ratchet head having a flange, said flange being dimensioned to fit within said receiving notch and having multiple channels, each of said multiple channels being aligned to receive said multiple pins wherein said multiple pins are inserted into said multiple channels and said at least one activating shaft into said at least one activating shaft channel to place said release device proximate said first side of said receiving area to maintain said ratchet head flange securely within said receiving notch.

2. The ratchet wrench of claim 1 wherein one of said multiple pins is a pivot pin, said pivot pin being positioned at a first end of said central plate and having a first length.

3. The ratchet wrench of claim 2 wherein a second of said multiple pins is a locking pin, said locking pin being spaced from said pivot pin and having a second length.

4. The ratchet wrench of claim 1 wherein said activating shaft is positioned at a second end of said central plate and has a third length.

5. The ratchet wrench of claim 2 wherein a second of said multiple pins is a locking pin, said locking pin being spaced from said pivot pin and having a first length.

6. The ratchet of claim 4 wherein said third length is greater than the distance between first side and said second side of said receiving area.

7. The ratchet of claim 6 further comprising a resistance system, said resistance system being affixed to said activating shaft proximate said receiving area second side, said resistance system maintaining said central plate adjacent to said receiving area.

8. The ratchet of claim 7 where depression of said resistance system to a first point removes at least one of said multiple pins from said ratchet head flange channels.

9. The ratchet of claim 8 wherein depression of said resistance system to a second point removes all of said multiple pins from said ratchet head flange channels.

10. The ratchet of claim 1 further comprising a release member and wherein said activating shaft is notched to create a stop along a length of said shaft, said release member interacting with said stop to prevent depression of said activating shaft without removal of said release member.

11. The ratchet of claim 10 wherein said release member is a pin extending into said receiving area and a spring on the exterior of said release member.

12. The ratchet of claim 10 wherein said release member is a ball nose spring plunger pin, said ball nose coming in contact with said activating shaft stop when said activating shaft is depressed at a first pressure and said ball nose withdrawing into said plunger pin at a second pressure to enable said activating shaft to depress fully.

13. The ratchet of claim 1 wherein said ratchet head flange has a first end, a second end and a width, said second end being contiguous with said ratchet head and said first end having multiple holes along said width, said multiple holes being dimensioned to receive said locking pin, and a pivot hole, said pivot hole being centered within said flange proximate said second end and dimensioned to receive said pivot pin.

14. The ratchet of claim 13 wherein further comprising a recessed channel along said width, said multiple holes being within said recessed channel.

15. A ratchet wrench having a removable ratchet head, said wrench having:

- a body, said body having a handle and a receiving area, said receiving area having
  - a first side;
  - a second side, said second side being parallel to said first side;
  - a receiving notch, said receiving notch being between said first side and said second side and having an open end and a closed end;
  - multiple channels, at least one of said channels extending from said first side, through said notch, to said second side;
  - at least one activating shaft channel, said activating shaft channel extending from said first side to said second side, through said receiving area proximate said receiving notch closed end;
- a release device, said release device having
  - a central plate,
  - a pivot pin, said pivot pin being at right angles to said central plate, said pivot pin being attached to and extending dimensioned to align with and fit within one of said multiple channels;
  - a locking pin, said locking pin being attached to and extending at right angles to said central plate and spaced from said pivot pin, said locking pin being dimensioned to align with and fit within one of said multiple channels
  - at least one activating shaft, said at least one activating shaft being at right angles to said central plate, said activating shaft being dimensioned to align with and fit within said activating shaft channel and have a length greater than the distance between first side and said second side of said receiving area;
- a resistance system, said resistance system being affixed to said activating shaft proximate said receiving area second side, said resistance system maintaining said central plate adjacent to said receiving area and depression of said resistance system to a first point removes said locking pin from said ratchet head flange channels and depression of said resistance system to a second point removes said locking pin and said pivot pin from said ratchet head flange channels;
- a ratchet head, said ratchet head having a flange, said flange being dimensioned to fit within said receiving notch and having multiple channels, each of said multiple channels being aligned to receive said multiple pins, said ratchet head flange having a first end, a second end and a width, said second end being contiguous with said ratchet head and said first end having multiple holes along said width, said multiple holes being dimensioned to receive said locking pin, and a pivot hole, said pivot hole being centered within said flange proximate said second end and dimensioned to receive said pivot pin;
- wherein said multiple pins are inserted into said multiple channels place said release device proximate said first side of said receiving area to maintain said ratchet head flange securely within said receiving notch.

16. The ratchet of claim 15 further comprising a release member and wherein said activating shaft is notched to create a stop along a length of said shaft, said release member interacting with said stop to prevent depression of said activating shaft without removal of said release member, said release member being a pin extending into said receiving area and a spring on the exterior of said release member.

17. The ratchet of claim 15 further comprising a release member and wherein said activating shaft is notched to create a stop along a length of said shaft, said release member interacting with said stop to prevent depression of said activating shaft without removal of said release member, said release member being a ball nose spring plunger pin, said ball nose coming in contact with said activating shaft stop when said activating shaft is depressed at a first pressure and said ball nose withdrawing into said plunger pin at a second pressure to enable said activating shaft to depress fully.

* * * * *